United States Patent
DeGuia

(10) Patent No.: US 6,780,958 B2
(45) Date of Patent: Aug. 24, 2004

(54) SPANDEX COMPOSITIONS

(75) Inventor: Andrea DeGuia, Bradenton, FL (US)

(73) Assignee: RadiciSpandex Corporation, Gastonia, NC (US)

( * ) Notice: Subject to any disclaimer, the term of this patent is extended or adjusted under 35 U.S.C. 154(b) by 0 days.

(21) Appl. No.: 10/201,304

(22) Filed: Jul. 24, 2002

(65) Prior Publication Data

US 2003/0088049 A1 May 8, 2003

Related U.S. Application Data

(60) Provisional application No. 60/307,154, filed on Jul. 24, 2001.

(51) Int. Cl.[7] ................................................ C08G 18/48
(52) U.S. Cl. ......................................... 528/79; 528/906
(58) Field of Search ............................ 528/79, 906, 49, 528/61

(56) References Cited

U.S. PATENT DOCUMENTS

| | | |
|---|---|---|
| 3,679,631 A | 7/1972 | Mayes |
| 4,442,281 A * | 4/1984 | Hentschel et al. ............ 528/79 |
| 4,973,647 A | 11/1990 | Bretches et al. |
| 5,000,899 A | 3/1991 | Dreibelbis et al. |
| 5,362,432 A | 11/1994 | Houser et al. |
| 5,840,233 A | 11/1998 | Foss |
| 5,959,059 A | 9/1999 | Vedula et al. |

FOREIGN PATENT DOCUMENTS

| | | |
|---|---|---|
| JP | 58194915 A | 11/1983 |
| JP | 03279415 A | 12/1991 |
| KR | 10-0273189 B1 | 5/2000 |
| KR | 2000-0025061 A | 5/2000 |

* cited by examiner

*Primary Examiner*—Rachel Gorr
(74) *Attorney, Agent, or Firm*—Wilmer Cutler Pickering Hale and Dorr LLP

(57) ABSTRACT

The invention provides an improved spandex that is prepared from a polyurethane that is the reaction product of organic diisocyanates, polymeric glycols, and polyols that have an aromatic functionality, such as alkoxylated phenols. The spandex has improved resistance to high temperature dyeing with minimal loss of physical properties, such as elastic recovery.

57 Claims, 3 Drawing Sheets

SPANDEX COMPOSITIONS

RELATED APPLICATIONS

This application claims priority to U.S. Provisional Application No. 60/307,154 filed Jul. 24, 2001, the disclosure of which is incorporated by reference herein in its entirety.

FIELD OF THE INVENTION

The invention is directed to spandex. More particularly, the invention provides spandex that is made from one or more polyols that have an aromatic functionality. The spandex of the invention has improved resistance when exposed to high temperature, including high temperature dyeing, with minimal loss of desirable physical properties, such as elastic recovery.

BACKGROUND OF THE INVENTION

Spandex is a long-chain synthetic polymer fiber comprising at least 85% by weight of a segmented polyurethane. As shown in FIG. 1, spandex has two segments: a soft, rubbery segment A and a hard segment B. The soft segment A is generally made of a polymeric glycol which allows the fiber to stretch and to recover its original shape. The hard segment B is generally made of a polyurethane which provides the fiber with rigidity and tensile strength. The polyurethane can be a polyurethaneurea, which is a sub-class of polyurethane.

The polyurethane is generally made by reacting a polymeric glycol with a diisocyanate to form a capped polymeric glycol. If a polyurethane without urea is desired, the capped polymeric glycol can be reacted with a diol chain extender and, optionally, a monofunctional chain terminator either in the melt or after being dissolved in a solvent. If a polyurethaneurea is desired, the capped polymeric glycol can be dissolved in a solvent before being reacted with a diamine chain extender and, optionally, a monofunctional chain terminator.

Spandex is typically prepared by reaction spinning, melt-spinning, dry-spinning, or wet-spinning a polyurethane solution either into a column filled with a hot inert gas such as air, nitrogen or steam or into an aqueous bath to remove the solvent followed by winding up the fiber. Methods for reaction spinning, melt spinning, dry spinning and wet spinning are known in the art.

Dry-spinning is the process of forcing a polymer solution through spinneret orifices into a shaft to form a filament. Heated inert gas is passed through the chamber, evaporating the solvent from the filament as the filament passes through the shaft. The resulting spandex can then be wound on a cylindrical core to form a spandex supply package.

Because of its good elasticity and tensile strength, spandex has been used to make articles of clothing, such as intimate apparel, swimwear, sportswear, sheer hosiery, socks, dresses, suits, outerwear, and the like. Spandex has also been used in disposable personal care products, such as baby diapers, feminine care products, adult incontinence garments, protective masks, medical garments, industrial garments and the like. Spandex can also be used in upholstery and in other commercial and industrial applications. Spandex is generally blended with other natural or man-made fibers, such as nylon, polyester, cotton, wool, silk and linen.

Spandex tends to lose elasticity when subjected to high temperatures during the dyeing process. In view thereof, there is a need in the art to produce spandex that has excellent elasticity after being subjected to the high temperatures associated with the dyeing processes. The invention is directed to this, as well as other, important ends.

SUMMARY OF THE INVENTION

In one embodiment, the invention provides a spandex comprising a polyol having at least one aromatic functionality, such as a phenol.

In another embodiment, the invention provides a spandex that is the reaction product of a polymeric glycol, a polyol having at least one aromatic functionality, an organic diisocyanate, and at least one chain extender.

In another embodiment, the invention provides a method for making spandex by mixing a polymeric glycol and a polyol having an aromatic functionality to form a resin mixture; mixing the resin mixture with an organic diisocyanate to form a capped-glycol, polymerizing the capped-glycol to form a polyurethane, and then forming the spandex from the polyurethane.

These and other aspects of the invention are described in more detail herein.

DETAILED DESCRIPTION OF THE INVENTION

Figure 1:
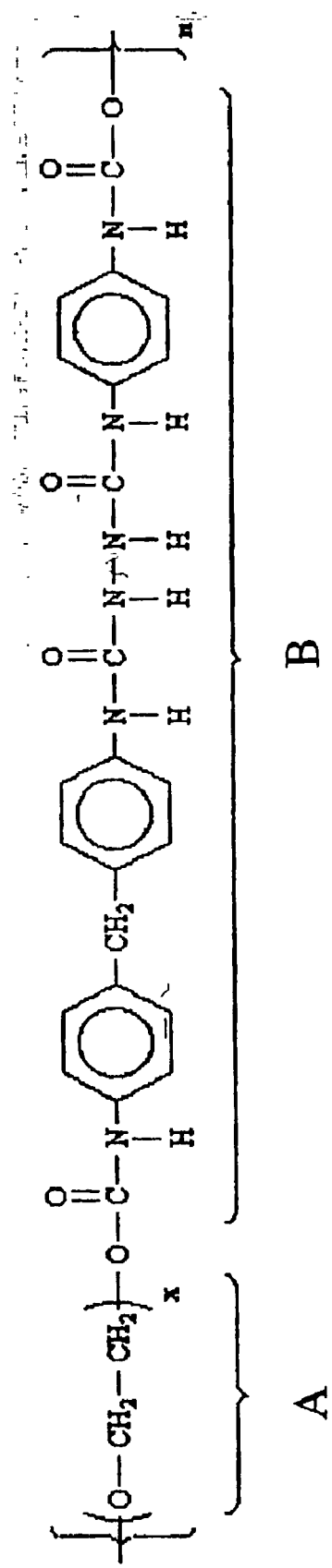
FIG. 1 is an exemplary chemical structure for prior art spandex.

The inventors have unexpectedly discovered that spandex made from one or more polyols that have an aromatic functionality has significantly increased heat resistance and significantly improved modulus retention. This discovery is significant because spandex tends to lose elasticity and strength after exposure to elevated temperatures, such as when undergoing high temperature dyeing processes.

The invention provides spandex made from a polyurethane in which the soft segment comprises one or more polymeric glycols (e.g., polycarbonate glycols, polyester glycols, polyether glycols or mixtures of two or more thereof) and one or more polyols that have an aromatic functionality. In another embodiment, the soft segment of the polyurethane comprises about 95% to about 60% by weight of one or more polymeric glycols and about 5% to about 40% by weight of one or more polyols that have an aromatic functionality. In another embodiment, the soft segment of the polyurethane comprises about 90% to about 70% by weight of one or more polymeric glycols and about 10% to about 30% by weight of one or more polyols that have an aromatic functionality. In another embodiment, the soft segment of the polyurethane comprises about 90% to about 75% by weight of one or more polymeric glycols and about 10% to about 25% by weight of one or more polyols that have an aromatic functionality. In another embodiment, the soft segment of the polyurethane comprises about 85% to about 80% by weight of one or more polymeric glycols and about 15% to about 20% by weight of one or more polyols that have an aromatic functionality. "Fiber" includes, for example, staple fibers and continuous filaments. Preferred polymeric glycols are polyether diols and polyester diols, more preferably polyether diols.

Any polycarbonate glycol known in the art can be used in the soft segment of the polyurethane. Exemplary polycarbonate glycols include poly(pentane-1,5-carbonate) diol and poly(hexane-1,6-carbonate) diol.

Any polyester glycol known in the art can be used in the soft segment of the polyurethane. Exemplary polyester glycols are those that are the polycondensation products of diols (e.g., ethylene glycol, 1,4-butane diol, 2,2-dimethyl-1,3-propane diol) with diacids (e.g., adipic acid, succinic acid, dodecanedioic acid, and copolymers thereof).

Any polyether glycol known in the art can be used in the soft segment of the polyurethane. Exemplary polyether glycols include polymethyltetrahydrofuran, polybutylene glycol, polytetrahydrofuran (PTHF); poly(tetramethylene ether)glycol (PTMEG); polypropylene glycol (PPG); poly(3-methyl-1,5-pentamethylene ether)glycol; poly(tetramethylene ether-co-3-methyltetramethylene ether) glycol, and mixtures of two or more thereof. The polyether glycols are generally linear, hydroxyl-terminated polyols with an average molecular weight (Mn) of about 500 to about 10,000; or about 500 to about 5,000; or about 600 to about 2,000. In another embodiment, the molecular weight of the polyether glycol is about 1,750 to about 2,250. In one embodiment, the polyether glycol is polytetrahydrofuran.

Polyols having an aromatic functionality include, for example, alkoxylated phenols. Alkoxylated phenols include, for example, alkoxylated diphenols and alkoyxlated dihydric phenols. Exemplary alkoxylated dihydric phenols include alkoxylated 2,2-bis(4-hydroxyphenyl)propane (i.e., alkoxylated bisphenol A), alkoxylated bis(4-hydroxyphenyl) methane, alkoxylated 1,1-bis(4-hydroxyphenyl)ethane, alkoxylated 2,2-bis(4-hydroxy-3,5-dimethylphenyl) propane, alkoxylated 2,2-bis(4-hydroxy-3,5-dibromophenyl)propane, alkoxylated 2,2-bis(4-hydroxy-3-methylphenyl)propane, alkoxylated bis(4-hydroxyphenyl) sulfide and alkoxylated bis(4-hydroxyphenyl)sulfone. Alkoxylated bis(4-hydroxyphenyl)-alkane type dihydric phenols are more desirable, with alkoyxlated bisphenol A being the most desirable. Exemplary alkoxylated diphenols include alkoxylated diphenylphenol, alkoxylated bisphenol A, alkoxylated 2,4-bis(4-hydroxyphenyl)-2-methylbutane, alkoxylated 1,1-bis(4-hydroxyphenyl)cyclohexane, alkoxylated 1,1-bis(4-hydroxyphenyl)-3,3,5-trimethylcyclohexane, alkoxylated 4,4'-dihydroxydiphenyl sulphide, alkoxylated 4,4'-dihydroxydiphenyl sulphone as well as their di- and tetrabrominated or chlorinated derivatives such as, for example, alkoxylated 2,2-bis(3-chloro-4-hydroxyphenyl)propane, alkoxylated 2,2-bis(3,5-dichloro-4-hydroxyphenyl)propane or alkoxylated 2,2-bis(3,5-dibromo-4-hydroxyphenyl)propane. In one embodiment, the alkoxylated phenol is an alkoxylated bisphenol A.

The term "alkoxylated" refers to the group $(OR)_x$, where R is a straight or branched $C_{1-22}$ alkyl group, preferably a $C_{1-6}$ alkyl group, more preferably a $C_2$ alkyl group; and x refers to the number of moles of OR and is an integer from 1 to about 25, preferably from 2 to about 10

Alkoxylated bisphenol A includes, for example, ethoxylated bisphenol A, propoxylated bisphenol A, and mixtures thereof. The ethoxylated bisphenol A can contain from about 2 to about 10 moles of ethylene oxide, preferably about 4 to about 8 moles of ethylene oxide. The alkoxylated bisphenol A generally has a molecular weight of less than 500. The alkoxylated bisphenol A is preferably urethane grade, which means that it should have a low water (i.e., moisture) content and low alkalinity in terms of residual potassium (K) catalyst from the alkoxylation process. For example, the water content can be about 600 ppm or less; or about 550 ppm or less; or about 300 ppm or less; or about 250 ppm or less; or about 100 ppm or less. The potassium content can be about 40 ppm or less; or about 25 ppm or less; or about 20 ppm or less; or about 15 ppm or less; or about 10 ppm or less.

Generally, the polymeric glycol is mixed with the polyol having an aromatic functionality to produce a glycol resin mixture. Thereafter, the resin mixture is reacted with the organic diisocyanate to produce a polyurethane.

The hard segment of the polyurethane comprises polyurethanes which are derived from organic diisocyanates. In one embodiment, the polyurethane is a polyurethaneurea. Any organic diisocyanate known in the art can be used. Exemplary organic diisocyanates include 4,4'-methylene-bis (phenylisocyanate) (MDI); 1,1'-methylenebis(4-isocyanatocyclohexane); 4-methyl-1,3-phenylene diisocyanate; 5-isocyanato-1-(isocyanatomethyl)-1,3,3-trimethylcyclohexane; 1,6-hexamethylene diisocyanate; toluene-2,4-diisocyanate (TDI); and mixtures of two or more thereof. In one embodiment, the organic diisocyanate is 4,4'-methylene-bis(phenylisocyanate).

The spandex of the invention can be made using processes that are known in the art. For example, the glycol resin mixture, as described herein, can be mixed and reacted (i.e., "capped") with one or more organic diisocyanates to form capped glycols. The capping ratio (isocyanate end group (NCO)/OH) is generally in the range of about 1.5 to about 3; from about 1.5 to about 2; or from about 1.6 to about 1.9; or from about 1.6 to about 1.8; or from about 1.6 to about 1.7. The "capping ratio" is the molar ratio of organic diisocyanates to polymeric glycols that is used in the reaction that forms the capped glycols.

In one embodiment, the glycol resin mixture, as described herein, is mixed and reacted with an excess of one or more organic diisocyanates to form capped glycols. Typically, the excess NCO content of the capped glycols is in the range of about 2% to about 4%; or from about 2.4% to about 3.6%; or from about 2.8% to about 3.4%; or from about 2.9% to about 3.3%; or from about 3% to about 3.2%. "NCO content" refers to the isocyanate end group content of the isocyanate-capped glycols prior to the chain extension reaction.

Thereafter, the capped glycols are polymerized with one or more chain extenders, and, optionally, one or more chain terminators. In one embodiment, the capped glycols are chain extended with one or more diamines. In another embodiment, the capped glycols are chain extended with a mixture of two or more diamines.

Any chain extender known in the art can be used. Chain extenders generally include diols, diamines, amino alcohols and mixtures of two or more thereof. Generally, the chain extenders have a molecular weight of about 60 to about 500.

Any diol known in the art can be used can be used as a chain extender. Diols are generally used to make polyurethanes. Exemplary diols include trimethylene glycol, ethanediol, 1,6-hexanediol, neopentylglycol, diethylene glycol, dipropylene glycol, 1,4-butanediol, 1,2-propylene glycol, 1,4-cyclohexanediamethylol, 1,4-cyclohexanediol, 1,4-bis(2-hydroxyethoxy) benzene, bis(2-hydroxyethyl)

terephthalante, paraxylylenediol, and mixtures of two or more thereof. In one embodiment, the chain extender is an aliphatic diol having 2 to about 14 carbon atoms. In another embodiment, the chain extender is 1,4-butanediol.

Any diamine known in the art can be used as a chain extender. Diamines are generally used to make polyurethaneureas. Exemplary diamines include ethylene diamine (EDA), 1,3-cyclohexane diamine, 1,4-cyclohexane diamine, 1,3-diaminopropane, 1,2-diaminopropane (PDA), 1,3-diaminopentane, 2-methyl-1,5-pentanediamine, isophorone diamine (IPDA), 1-amino-3-aminoethyl-3,5,5-trimethyl cyclohexane, and mixtures of two or more thereof. The amount of diamine used is generally about 7% to about 13%, preferably about 9% to about 11% of the total weight of the capped glycol. In one embodiment of the invention, the chain extending reaction is conducted with a mixture of about 83% to about 92% ethylene diamine and about 8% to about 17% 1,2-diaminopropane, expressed as molar concentrations in the diamine mixture.

Chain terminators are generally used in the chain extending reaction in order to control the molecular weight of the polyurethane. Any chain terminator known in the art can be used. Exemplary chain terminators include diethylamine (DEA), cyclohexylamine, butylamine, hexanol, butanol, and mixtures of two or more thereof.

In one embodiment, diethylamine is used as the chain terminator in conjunction with at least two diamines (e.g., ethylenediamine and 1,2-diaminopropane) as the chain extenders. For example, the mixture of diamine chain extenders/terminators can be ethylenediamine in an amount of about 83% to about 92% by weight, 1,2-diaminopropane in an amount of about 8% to about 17% by weight, and diethylamine in an amount of about 5% to 15% by weight.

The chain-extending reaction can be conducted in one or more conventional solvents. Exemplary solvents include dimethylacetamide, dimethylformamide, N-methylpyrrolidone, dimethylsulfoxide, and mixtures of two or more thereof. In one embodiment, the solvent is dimethylacetamide.

After the polymerization reaction is complete, the concentration of the polyurethane (or polyurethaneurea) in the solution typically is about 30% to about 40% by weight; or about 31% to about 38% by weight; or about 32% to about 36% by weight; or about 33% to about 35% by weight; based on the total weight of the solution.

After the polymerization reaction is complete the spandex can be made by reaction spinning, melt spinning, dry spinning or wet spinning—all of which are known in the art. In one embodiment, the spandex is formed by dry spinning from the same solvent as was used for the polymerization reactions. For example, the resultant polyurethane can be used to produce spandex which can be wound at a speed of at least 550 meters per minute, preferably at least 700 meters per minute, most preferably at least 900 meters per minute. The result is a high-speed spun spandex.

The spandex can be spun as single filaments or can be coalesced by conventional techniques into multi-filament yarns. Each filament is of textile decitex, e.g., in the range of about 6 to about 25 decitex per filament.

The spandex of the invention can also contain or be coated with conventional agents that are added for specific purposes, such as chlorine resistant additives, antibacterial agents, antioxidants, thermal stabilizers (e.g., IRGANOX® MD 1024), UV light stabilizers (e.g., TINUVIN® 328), gas resistant stabilizers, pigments (e.g., ultramarine blue, ultramarine green) and delustrants (e.g, titanium dioxide), anti-tackiness additives (e.g., ethylene bis-stearamide, ethylene bis-oleylamide), heat setting additives, dyes, emulsifiers, wetting agents, antistatic agents, pH regulators, filament compacting agents, corrosion inhibitors, dispersing agents (e.g., NUOSPERSE® 657), and lubricating agents (e.g., silicone oil), all of which are known in the art.

Chlorine resistant additives known in the art can be used in the invention. Exemplary chlorine resistant additives include magnesium aluminum hydroxide carbonate hydrate; hydrotalcites such as DHT (i.e., $Mg_6Al_2(CO_3)(OH)_{16} \cdot 4(H_2O)$); and hydrated magnesium carbonates such as hydromagnesite (i.e., $Mg_5(CO_3)_4(OH)_2 \cdot 4(H_2O)$). In one embodiment, the hydrotalcite has a water of crystallization and is modified to have a $C_{10}$ to $C_{30}$ fatty acid (e.g., capric acid, lauric acid, myristic acid, palmitic acid, stearic acid) attached thereto. The chlorine resistant additive is generally used in an amount of about 0.1 to 10% by weight based on the polyurethane. In yet another embodiment, the polyurethane can comprise from 0.5% to 10% by weight of composite oxide particles containing aluminum and at least one of zinc and magnesium.

In another embodiment, the chlorine resistant additive is a hydrotalcite and/or another basic metal aluminum hydroxy compound coated with a polyorganosiloxane and/or with a mixture of polyorganosiloxane and polyorganohydrogensiloxane.

The spandex can have excellent resistance to yellowing and high mechanical resistance to chlorine when hydromagnesite, huntite ($CaMg_3(CO_3)_4$), zinc oxide and poly(N,N-diethyl-2-aminoethyl methacrylate) are used together.

Anti-tackiness additives known in the art can be used in the invention. Exemplary anti-tackiness additives include metal stearates (e.g., calcium stearate, magnesium stearate, zinc stearate) and barium sulfate.

Heat setting additives known in the art can be used in the invention. Exemplary heat setting additives include quaternary amine additives. In one embodiment, the heat setting additive is a quaternary amine having a functionality/kg of about 3 to about 100 meq.

Antioxidants provide high-temperature stability and long-term storage stability. Any antioxidant known in the art, such as amine-based and phenol-based antioxidants, can be used. Exemplary amine-based antioxidants include N,N-di(nonylphenyl)amine, diaryldiamines (e.g., N,N'-diphenylethylenediamine, N,N'-ditolylethylenediamine), naphthylamines (e.g., N-phenyl-1-naphthylamine, N-phenyl-2-naphthylamine), aromatic amines (e.g., N,N'-diisobutyl-p-phenylenediamine, N-cyclohexyl-N'-phenyl-p-phenylenediamine, N,N'-dinaphthyl-p-phenylenediamine, N,N'-ditolyl-p-phenylenediamine, N,N'-diphenyl-p-phenylenediamine, 6-ethoxydihydroquinoline, 4-isopropyoxydiphenylamine), and alkylated diphenylamines. Exemplary phenol-based antioxidants include bisphenols, monophenols, polyphenols and aminophenols. Phenol-based antioxidants include 2,2'-methylenebis(4-methyl-6-tert-butylphenol), 4,4'-methylenebis(2,6-di-tert-butylphenol), 4,4'-butylidenebis(3-methyl-6-tert-butylphenol), 4,4'-thiobis(3-methyl-6-tert-butylphenol, 4-tert-butylpyrocatechol, monomethyl ethers of hydroquinone, 2,6-di-tert-butyl-p-cresol, 1,1,3-tris(2-methyl-4-hydroxy-5-tert-butylphenyl)butane, 2,4,6-tertaminophenol, and the like. Preferred antioxidants include IRGANOX® 245 (triethyleneglycol bis[3-(3-tert-butyl-4-hydroxy-5-methylphenyl)proprionate) (Ciba Specialty Chemicals, Tarrytown, N.Y.) and bis-(2,4-dichlorobenzyl) hydroxylamine.

Lubricating agents known in the art can also be used, such as LUROL® 6534 (DSF-36) and LUROL® SF 8973A (Goulston Technologies, Inc.), or Witco lube (an organo-modified polydimethylsiloxane) (Crompton Corporation). Other lubricants include mineral oils, and fatty acid esters containing 8 to 22 carbon atoms in the fatty acid component and 1 to 22 carbon atoms in the alcohol component. Specific examples include palmitic acid methyl ester, isobutyl stearate and tallow fatty acid-2-ethylhexyl ester, polyol carboxylic acid ester, cocofatty acid esters or glycerol and alkoxylated glycerol, silicones, dimethylpolysiloxane, polyalkylene glycols and ethylene/propylene oxide copolymers, and other combinations that include magnesium stearate as well as higher fatty acids of palmitic acid/stearic acid.

Spandex should preferably exhibit excellent lubricity, static resistance and long-term storage stability. For example, spandex can be treated with fiber treatment composition containing polydimethylsiloxane, polyoxyalkylene-functional diorganopolysiloxane and an antioxidant. The antioxidant can have a straight or branched chain and can be linear or cyclic. In the case of straight chain structures, the molecular chain terminal group can be trimethylsiloxy or dimethyldydroxysiloxy. Such a fiber treatment composition can contain, for example, 100 weight parts of dimethylpolysiloxane having a viscosity of 3 to 30 mm$^2$/sec at 25° C. and 0.5 to 50 weight parts of a polyoxyalkylene-functional diorganopolysiloxane.

The invention also provides spandex supply packages comprising a core (e.g., cylindrical core) and the spandex of the invention wound up on the core.

In another embodiment, the invention provides articles of clothing and disposable personal care products made from spandex.

EXAMPLES

The following examples are for purposes of illustration only and are not intended to limit the scope of the appended claims.

Example 1

160 grams of a polytetrahydrofuran polyol (PTHF) with a molecular weight of 2000 and 26 grams of ethoxylated bisphenol A (EBA) having 4 moles of ethylene oxide were weighed into a 1-liter flask equipped with an agitator, thermometer, and nitrogen/vacuum inlet and heated to 110° F. 58 grams of 4,4'-methylene-bis(phenylisocyanate) (MDI) was then added and allowed to exotherm and heated to 160° F. The reaction was allowed to continue at 160°–165° F. for one hour under vacuum, before checking the excess NCO. 244 grams of dimethylacetamide was added to make a 50% solution and cooled to 80° F. for chain extension. A chain extension solution was prepared using 75% ethylene diamine, 15% 1,2-diaminepropane, 10% diethylamine, 0.4% CDSA hydroxylamine, 0.5% IRGANOX® 245 (a phenolic antioxidant from Ciba Specialty Chemicals, Tarrytown, N.Y.), 0.25% IRGANOX® MD 1024 (a phenolic antioxidant from Ciba Specialty Chemicals, Tarrytown, N.Y.), and an antiblocking agent. After mixing for one hour under vacuum, the spandex fiber solution was transferred into quart jars. Films were cast on glass and dried in a nitrogen oven for 1 hour at 150° F. Tensile strength was measured on the films before and after 300° F. for 30 minutes and modules before and after 265° F. for 30 minutes. The retention properties of Example 1 are shown in Table 1.

Example 2

The procedure used in Example 2 was the same as that used for Example 1, except that 156 grams of polytetrahydrofuran polyol (PTHF) and 31 grams of ethoxylated bisphenol A (EBA) with 6 moles of ethylene oxide were used. The retention properties of Example 2 are shown in Table 1.

Example 3

The procedure used in Example 3 was the same as that used for Example 2, except that a reaction temperature of 180 to 85° F. was used in Example 3. The retention properties of Example 3 are shown in Table 1.

Example 4

The procedure used in Example 4 was the same as that for Example 1, except that an antiblocking agent was not used. The retention properties of Example 4 are shown in Table 1.

Comparative Example A

No ethoxylated bisphenol A (EBA) was used in Comparative Example A. 200 grams of a polytetrahydrofuran polyol (PTHF) with a molecular weight 2000 and 45 grams of 4,4'-methylene-bis(phenylisocyanate) (MDI) were reacted in a 1-liter flask at 200 to 205° F. for one hour. When the correct excess NCO was attained, the mixture was diluted to 50% solids with dimethylacetamide, cooled to 80° F. and the required amines added, together with stabilizers and anti-blocking agent (as described in Example 1). Tensile strength before and after 300° F. for 30 minutes and modulus before and after 265° F. for 30 minutes were measured on dried films. The retention properties of Comparative Example A are shown in Table 1. The composition and reaction properties of Comparative Example A are shown in Table 2.

TABLE 1

| Property | Example 1 | Example 2 | Example 3 | Example 4 | Comparative Example A |
|---|---|---|---|---|---|
| % Tensile Strength Retention | 92 | 131 | 120.3 | 187.3 | 124.9 |
| Out Modulus, 200%, % Retention | 110.5 | 112.5 | 107.7 | 133.3 | 87.2 |
| Out Modulus, 250%, % Retention | 114.3 | 115.1 | 107.9 | 130.4 | 84.8 |
| Return Modulus, 100%, % Retention | 116.7 | 115.4 | 110.5 | 144.8 | 93.3 |
| Return Modulus, 200%, % Retention | 108.7 | 113.8 | 103 | 191.7 | 88 |

TABLE 2

| Premixture Ingredient wt. g. | Example 5 | Example 6 | Example 7 | Example 8 | Example 9 | Example 10 | Comp. A | Comp. B | Comp. C |
|---|---|---|---|---|---|---|---|---|---|
| PTHF | 156 | 156 | 156 | 148 | 160 | 156 | 200 | 200 | 200 |
| EBA | 31 | 31 | 31 | 37 | 26 | 31 | — | — | — |
| MDI | 58 | 58 | 58 | 60 | 58 | 57 | 45 | 45 | 45 |
| ITP | | | | | | | | | |
| Properties: | | | | | | | | | |
| Theoretical NCO | 3.12% | 3.12% | 3.12% | 3.12% | 3.07% | 3.0% | 2.74% | 2.74% | 2.74% |
| Actual NCO | 2.84% | 2.82% | 2.81% | 2.91% | 3.42% | 3.26% | 2.65% | 2.53% | 2.86% |

Examples 5, 6 and 7

Examples 5, 6 and 7 were prepared using the procedure described for Example 1. In Examples 5–7 of the invention, the ethoxylated bisphenol A (EBA) had 6 moles of ethylene oxide. Moisture/potassium levels in parts per million (ppm) for Examples 5, 6 and 7 were 530/12, 250/6.2, and 250/15, respectively. The formulations used in Examples 5, 6 and 7 are shown in Table 2. The properties of Examples 5, 6 and 7 are shown in Table 3.

Comparative Example B

Comparative Example B was produced as described in Example 1 without the use of ethoxylated bisphenol A (EBA). The formulation used in Comparative Example B is shown in Table 2. The properties of Comparative Example B is shown in Table 3.

TABLE 3

| | Example 5 | Example 6 | Example 7 | Comparative Example B |
|---|---|---|---|---|
| $H_2O$ in ppm/K in ppm | 530/12 | 250/6.2 | 250/15 | |
| % EBA | 16.6 | 16.6 | 16.6 | 0 |
| NCO/OH | 1.645 | 1.645 | 1.645 | 1.8 |
| Theoretical % NCO | 3.12 | 3.12 | 3.12 | 2.74 |
| Viscosity | 38,400 | 68,800 | 60,800 | 20,000 |
| % Tensile Strength Retention after 30 mins @ 300° F. | 172.2 | 167.3 | 135.5 | 123.7 |
| % Out Modulus, 200% Retention after 30 mins @ 265° F. | 113.8 | 107.7 | 111.1 | 112.5 |
| % Out Modulus, 250%, Retention after 30 mins @ 265° F. | 110 | 102.8 | 108.1 | 112.9 |
| % Return Modulus, 100%, Retention after 30 mins at 265° F. | 125 | 110 | 109.1 | 122.2 |
| % Return Modulus, 200%, Retention after, 30 mins at 265° F. | 115 | 105.6 | 111.1 | 106.7 |
| % Out Modulus, 200%, Retention after 1 min at 390° F. | 100 | 92.3 | 88.9 | 87.5 |

Examples 8, 9 and 10

Similar to the above examples, Examples 8, 9 and 10 were produced using a mixture having 20% ethoxylated bisphenol A (EBA) with 6 moles ethylene oxide, but with different moisture and potassium levels (250/15; 250/6.2; and 530/12, respectively). The formulations used in Examples 8, 9 and 10 are shown in Table 2. The properties of Examples 8, 9 and 10 are shown in Table 4.

Comparative Example C

The formulation used in Comparative Example C is shown in Table 2. The properties of Comparative Example C is shown in Table 4.

Figure 2:
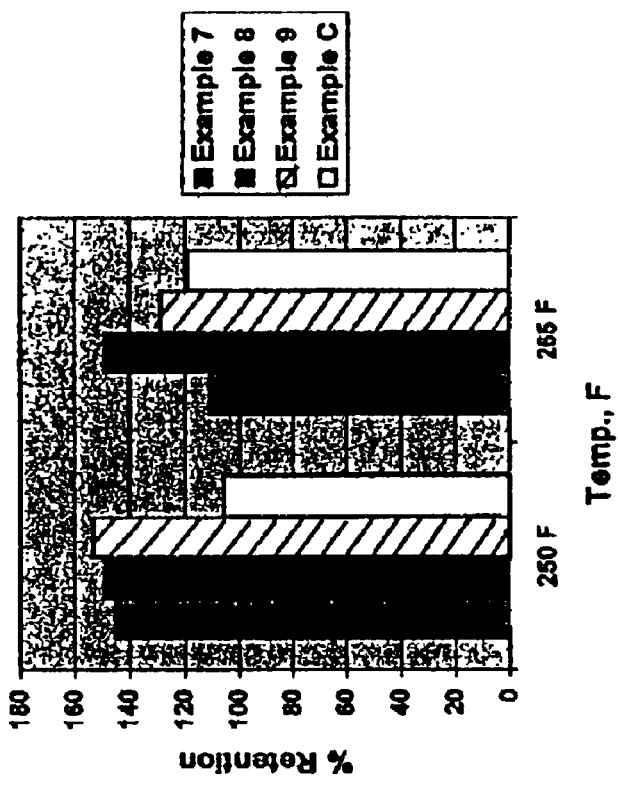
FIG. 2 is a graphical representation of return modulus at 200% elongation after pressure dyeing inventive and comparative spandexes.
Figure 3:
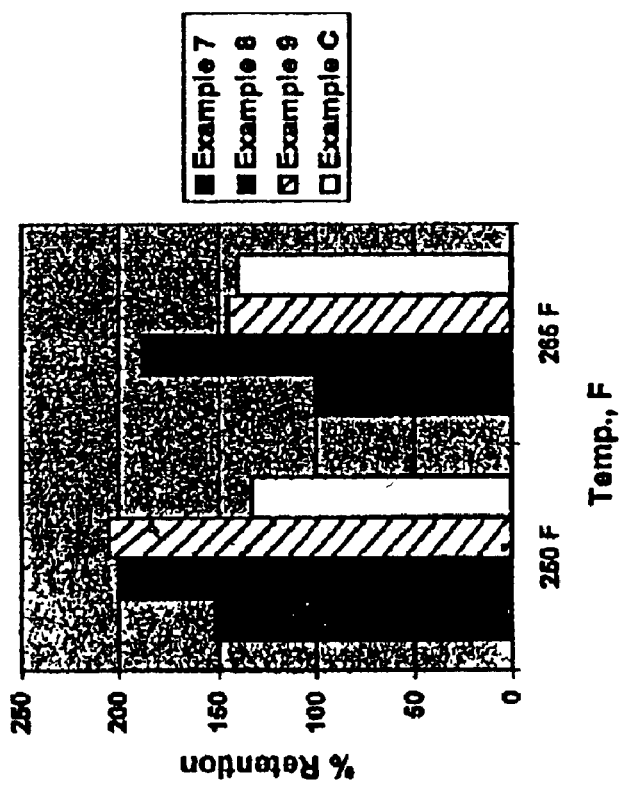
FIG. 3 is a graphical representation of return modulus at 250% elongation after pressure dyeing inventive and comparative spandexes.
Figure 5:
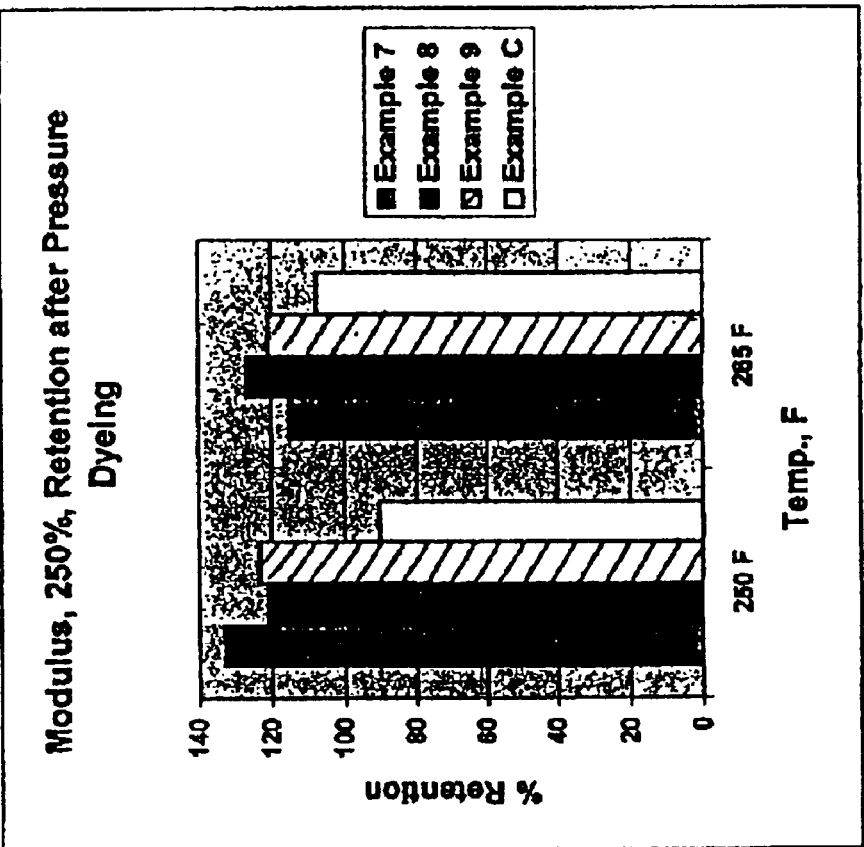
FIG. 5 is a graphical representation of out modulus at 250% elongation after pressure dyeing inventive and comparative spandexes.
Figure 4:
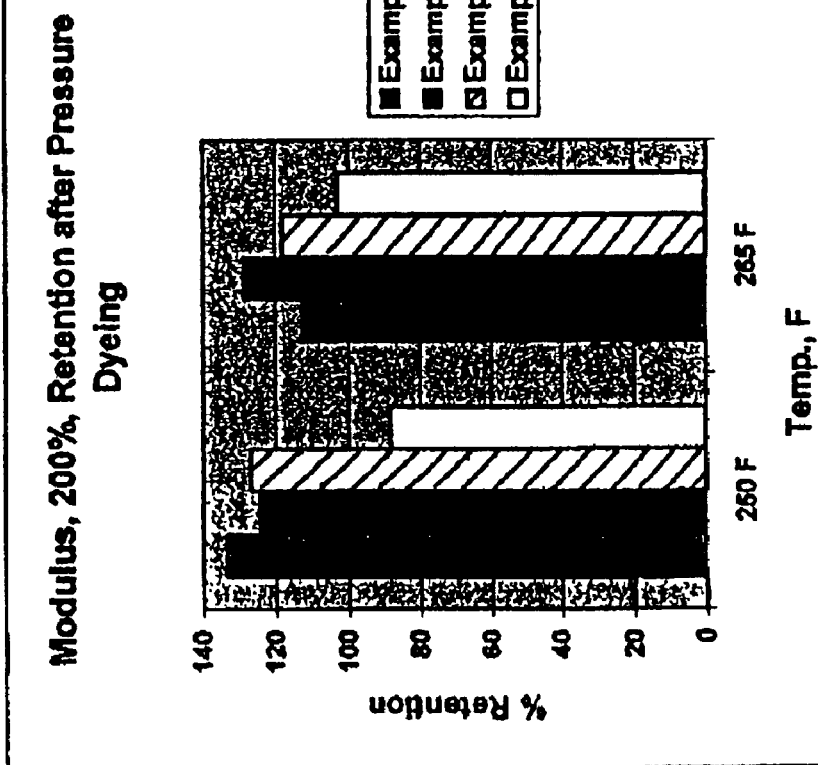
FIG. 4 is a graphical representation of out modulus at 200% elongation after pressure dyeing inventive and comparative spandexes.

The improvement in % of retention properties of the invention is clearly demonstrated when compared with the results shown for Comparative Example C. These results show the effect of the high potassium level in Example 8 on return modulus retention and the better retention of properties of the ethoxylated bisphenol A (EBA) modified examples compared to the Comparative Example. FIGS. 1–2 provide a graphic representation of the improved return and out modulus retentions of Examples 8–10.

TABLE 4

| Premixture Ingredients Weight. | Example 8 | Example 9 | Example 10 | Comparative Example C |
|---|---|---|---|---|
| ppm $H_2O$/ppmK | 250/15 | 250/6.2 | 530/12 | Control |
| % EBA | 20 | 20 | 20 | 0 |
| NCO/OH | 1.61 | 1.61 | 1.61 | 1.8 |
| Theoretical % NCO | 3.12 | 3.12 | 3.12 | 2.74 |
| Viscosity | 18,400 | 28,800 | 35,200 | 11,200 |
| % Elongation, | 650 | 667 | 650 | 700 |
| Tensile Strength Retention | | | | |
| After 60' @ 250 F. | 122. | 97.1 | 117.9 | 125.5 |
| After 60' @ 265 F. | 137.9 | 114.5 | 123.8 | 121.5 |
| % Out Modulus, 200%, Retention | | | | |
| After 60' @ 250 F. | 133.3 | 124.3 | 127.0 | 88.2 |
| After 60' @ 265 F. | 112.6 | 128.8 | 118.0 | 102.9 |
| % Out Modulus, 250%, Retention | | | | |
| After 60' @ 250 F. | 133.0 | 121.0 | 123.3 | 90.3 |
| After 60' @ 265 F. | 115.0 | 126.8 | 120.6 | 107.3 |
| % Return Modulus, 200%, Retention | | | | |
| After 60' @ 250 F. | 151.6 | 200.0 | 205.0 | 133.0 |
| After 60' @ 265 F. | 100.0 | 188.2 | 145.0 | 140.0 |
| % Return Modulus, 250%, Retention | | | | |
| After 60' @ 250 F. | 144.6 | 148.8 | 153.1 | 105.6 |
| After 60' @ 265 F. | 110.7 | 148.8 | 128.6 | 119.0 |

TEST PROCEDURES

Viscosity

Viscosity was measured with a Brookfield Viscometer, Model LV-DVII+, having LV Spindles 1-4. High viscosity resins and prepolymers were measured at 25.6° C. using an SC4-25 spindle. Readings on high viscosity resins and prepolymers were taken only after the test materials had been on the viscometer for twenty minutes, at five minute intervals. A final measurement was established after two consecutive readings agreed.

Elongation Test

Approximately 18 inches of the material to be tested was stamped with a one inch bench mark, marking the sample in two places at a one inch interval. Caution was taken to ensure the sample had not been stretched more than 300%. After placing the first mark at the zero point of a twelve inch ruler, the sample was stretched until it broke. The position of the second mark on the ruler was then recorded at the break point. The percentage of elongation was calculated by subtracting the original length from the length at break of the second mark, and multiplying by one hundred.

Modulus Test

An sample of material to be tested was cut to approximately twelve inches with scissors or 12" gauge shears and immediately tested with a Sintech instrument equipped with a 1–500 g full scale range load cell. Caution was taken to ensure that the test materials were not stretched prior to testing.

Tensile Test

The tensile strength of the material to be tested was measured with a Globe Force Gauge Stand having a ½" diameter revolving shaft and a vertically mounted spring gauge or digital force gauge which records force in ounces or pounds. The scale has a pulley which must be positioned approximately 4 inches from the shaft of the Force Gauge Stand.

A sample of the material to be tested was looped over the pulley of the scale, or the equivalent of the pulley. Then, the shaft of the Force Gauge was revolved. While the shaft was revolving, the loose ends of the sample were wrapped around the shaft until the ends became trapped, and the sample began rotating on its own. The peak load was then recorded in pounds.

Film Preparation

A film was prepared by pouring a suitable amount of the polymer solution onto a glass plate, and using a 0.060 Gardner's knife to pull the sample to the desired length. The resultant film was dried in a nitrogen oven at 150° F. for one hour.

Pressurized Dyeing Procedure

This procedure was performed on cut strips of films using a Polymat Dyeing Machine. The test specimens were placed in different stainless steel beakers of the machine containing 200 cc deionized water adjusted to pH 4.5–5.0 and then the lids were closed. The test was run at three temperature levels, 230° F., 250° and 265° F. for one hour, after which time, the specimens were completely dried and allowed to recondition. Tensile strength, elongation to break and modulus were then measured on the treated films to determine retention of above properties.

The patents, patent applications, and publications cited herein are incorporated by reference herein in their entirety.

Various modifications of the invention, in addition to those described herein, will be apparent to one skilled in the art from the foregoing description. Such modifications are intended to fall within the scope of the appended claims.

What is claimed is:

1. A spandex produced from a polyurethane, wherein the polyurethane is made by a method comprising:
   (a) mixing at least one polymeric glycol and at least one polyol having an alkoxylated aromatic functionality;
   (b) reacting the product of step (a) with at least one organic diisocyanate; and
   (c) polymerizing the product of step (b) with at least one diamine.

2. The spandex of claim 1, wherein the polymeric glycol is polymethyltetrahydrofuran, polybutylene glycol, polytetrahydrofuran, poly(tetramethylene ether)glycol, polypropylene glycol, poly(3-methyl-1,5-pentamethylene ether)glycol, poly(tetramethylene ether-co-3-methyltetramethylene ether)glycol, or a mixture of two or more thereof; wherein the polyol having an alkoxylated aromatic functionality is alkoxylated bisphenol A, alkoxylated bis(4-hydroxyphenyl)methane, alkoxylated 1,1-bis(4-hydroxyphenyl)ethane, alkoxylated 2,2-bis(4-hydroxy-3,5-dimethylphenyl)propane, alkoxylated 2,2-bis(4-hydroxy-3,5-dibromophenyl)propane, alkoxylated 2,2-bis(4-hydroxy-3-methylphenyl)propane, alkoxylated bis(4-hydroxyphenyl)sulfide, alkoxylated bis(4-hydroxyphenyl)sulfone, alkoxylated diphenylphenol, alkoxylated 2,4-bis(4-hydroxyphenyl)-2-methylbutane, alkoxylated 1,1-bis(4-hydroxyphenyl)cyclohexane, alkoxylated 1,1-bis(4-hydroxyphenyl)-3,3,5-trimethylcyclohexane, alkoxylated 4,4'-dihydroxydiphenyl sulphide, alkoxylated 4,4'-dihydroxydiphenyl sulphone, or a mixture of two or more thereof; and wherein the organic diisocyanate is 4,4'-methylene-bis(phenylisocyanate) 1,1'-methylenebis(4-isocyanatocyclohexane); 4-methyl-1,3-phenylene diisocyanate; 5-isocyanato-1-(isocyanatomethyl)-1,3,3-trimethylcyclohexane; 1,6-hexamethylene diisocyanate; toluene-2,4-diisocyanate; or a mixture of two or more thereof.

3. The spandex of claim 1, comprising mixing the at least one polymeric glycol in an amount of 70% to 90% by weight and the at least one polyol having an alkoxylated aromatic functionality in an amount of 10% to 30% by weight.

4. A spandex dry-spun from a solution of polyurethaneurea in an organic solvent, wherein the polyurethaneurea is made by a method comprising mixing 90% to 70% by weight polytetrahydrofuran and 10% to 30% by weight ethoxylated bisphenol A to form a resin; and reacting the resin with 4,4'-methylene-bis(phenylisocyanate), wherein the capping ratio is 1.5 to 2.

5. A spandex dry-spun from a solution of polyurethaneurea in an organic solvent, wherein the polyurethaneurea is made by a method comprising mixing 90% to 70% by weight polytetrahydrofuran and 10% to 30% by weight ethoxylated bisphenol A to form a resin; and reacting the resin with 4,4'-methylene-bis(phenylisocyanate) to form a capped glycol, wherein the capping ratio is 1.5 to 2; and polymerizing the capped glycol with a mixture comprising 83% to 92% by weight ethylenediamine, 8% to 17% by weight 1,2-diaminopropane; and 5% to 15% by weight diethylamine to form the polyurethaneurea.

6. A spandex comprising a polyurethaneurea which comprises an alkoxylated bisphenol A.

7. The spandex of claim 6, wherein the alkoxylated bisphenol A is an ethoxylated bisphenol A having from 2 to 10 moles ethylene oxide.

8. The spandex of claim 6, wherein the alkoxylated bisphenol A has a water content less than 550 ppm and a potassium content less than 25 ppm.

9. A method for making spandex comprising:
   mixing at least one polymeric glycol and at least one polyol having an alkoxylated aromatic functionality to form a resin mixture;
   mixing the resin mixture with at least one organic diisocyanate to form an isocyanate-capped glycol:
   polymerizing the isocyanate-capped glycol with at least one diamine to form a polyurethane; and reaction spinning, melt spinning, dry spinning or wet spinning the polyurethane to form the spandex.

10. The method of claim 9, wherein the polymeric glycol is polymethyltetrahydrofuran, polybutylene glycol, polytetrahydrofuran, poly(tetramethylene ether)glycol, polypropylene glycol, poly(3-methyl-1,5-pentamethylene ether)glycol, poly(tetramethylene ether-co-3-methyltetramethylene ether)glycol, or a mixture of two or more thereof; wherein the polyol having an alkoxylated aromatic functionality is alkoxylated bisphenol A, alkoxylated bis(4-hydroxyphenyl)methane, alkoxylated 1,1-bis(4-hydroxyphenyl)ethane, alkoxylated 2,2-bis(4-hydroxy-3,5-dimethylphenyl)propane, alkoxylated 2,2-bis(4-hydroxy-3,5-dibromophenyl)propane, alkoxylated 2,2-bis(4-hydroxy-3-methylphenyl)propane, alkoxylated bis(4-hydroxyphenyl) sulfide, alkoxylated bis(4-hydroxyphenyl)sulfone, alkoxylated diphenylphenol, alkoxylated 2,4-bis(4-hydroxyphenyl)-2-methylbutane, alkoxylated 1,1-bis(4-hydroxyphenyl)cyclohexane, alkoxylated 1,1-bis(4-hydroxyphenyl)-3,3,5-trimethylcyclohexane, alkoxylated 4,4'-dihydroxydiphenyl sulphide, alkoxylated 4,4'-dihydroxydiphenyl sulphone, or a mixture of two or more thereof; and wherein the organic diisocyanate is 4,4'-methylene-bis(phenylisocyanate); 1,1'-methylenebis(4-isocyanatocyclohexane); 4-methyl-1,3-phenylene diisocyanate; 5-isocyanato-1-(isocyanatomethyl)-1,3,3-trimethylcyclohexane; 1,6-hexamethylene diisocyanate; toluene-2,4-diisocyanate; or a mixture of two or more thereof.

11. The method of claim 9, comprising mixing at least one polymeric glycol in an amount of 70% to 90% by weight and at least one polyol having an alkoxylated aromatic functionality in an amount of 10% to 30% by weight to form the resin mixture.

12. The method of claim 9, wherein the capping ratio of the isocyanate-capped glycol is 1.5 to 2.

13. The method of claim 9, wherein the polymeric glycol is polytetrahydrofuran; the polyol having an alkoxylated aromatic functionality is alkoxylated bisphenol A, and the organic diisocyanate is 4,4'-methylene-bis(phenylisocyanate).

14. The method of claim 9, comprising polymerizing the isocyanate-capped glycol with at least two diamines to form a polyurethane.

15. The method of claim 9, comprising polymerizing the isocyanate-capped glycol with ethylenediamine, 1,2-diaminopropane and diethylamine.

16. A spandex formed by the method of claim 9.

17. An article of clothing comprising the spandex of claim 1, 4, 5, 6, or 16.

18. A disposable personal care product comprising the spandex of claim 1, 4, 5, 6 or 16.

19. The spandex of claim 4, wherein the ethoxylated bisphenol A contains from about 2 to about 10 moles of ethylene oxide.

20. The spandex of claim 19, wherein the ethoxylated bisphenol A contains from about 4 to about 8 moles of ethylene oxide.

21. The spandex of claim 4, wherein the organic solvent comprises dimethylacetamide, dimethylformamide, N-methylpyrrolidone, dimethylsulfoxide, or a mixture of two or more thereof.

22. The spandex of claim 4, further comprising a chlorine resistant additive, an antibacterial agent, an antioxidant, a thermal stabilizer, a gas resistant stabilizer, a pigment, a delustrant, an anti-tackiness additive, a heat setting additive, a dye, an emulsifier, a wetting agent, an antistatic agent, a pH regulator, an antiblocking agent, a filament compacting agent, a corrosion inhibitor, a dispersing agent, a lubricating agent, or a mixture of two or more thereof.

23. A supply package comprising a core and the spandex of claim 4.

24. The spandex of claim 5, wherein the ethoxylated bisphenol A contains from about 2 to about 10 moles of ethylene oxide.

25. The spandex of claim 24, wherein the ethoxylated bisphenol A contains from about 4 to about 8 moles of ethylene oxide.

26. The spandex of claim 5, wherein the organic solvent comprises dimethylacetamide, dimethylformamide, N-methylpyrrolidone, dimethylsulfoxide, or a mixture of two or more thereof.

27. The spandex of claim 5, further comprising a chlorine resistant additive, an antibacterial agent, an antioxidant, a thermal stabilizer, a gas resistant stabilizer, a pigment, a delustrant, an anti-tackiness additive, a heat setting additive, a dye, an emulsifier, a wetting agent, an antistatic agent, a pH regulator, an antiblocking agent, a filament compacting agent, a corrosion inhibitor, a dispersing agent, a lubricating agent, or a mixture of two or more thereof.

28. A supply package comprising a core and the spandex of claim 5.

29. The spandex of claim 1, wherein the polymeric glycol is a polycarbonate glycol, a polyester glycol, a polyether glycol, or a mixture of two or more thereof.

30. The spandex of claim 1, wherein the polymeric glycol is poly(pentane-1,5-carbonate)diol, poly(hexane-1,6-carbonate(diol), or a mixture thereof.

31. The spandex of claim 1, wherein the polymeric glycol is a polycondensation product of a diol and a diacid.

32. The spandex of claim 31, wherein the diol is ethylene glycol, 1,4-butane diol, 2,2-dimethyl-1,3-propane diol, or a mixture of two or more thereof.

33. The spandex of claim 31, wherein the diacid is adipic acid, succinic acid, dodecanedioic acid, or a mixture of two or more thereof.

34. The spandex of claim 1, wherein the polyol having an alkoxylated aromatic functionality is alkoxylated 2,2-bis(4-hydroxyphenyl)propane, alkoxylated bis(4-hydroxyphenyl)methane, alkoxylated 1,1-bis(4-hydroxyphenyl)ethane, alkoxylated 2,2-bis(4-hydroxy-3,5-dimethylphenyl)propane, alkoxylated 2,2-bis(4-hydroxy-3,5-dibromophenyl)propane, alkoxylated 2,2-bis(4-hydroxy-3-methylphenyl)propane, alkoxylated bis(4-hydroxyphenyl)sulfide, alkoxylated bis(4-hydroxyphenyl)sulfone or a mixture of two or more thereof.

35. The spandex of claim 1, wherein the polyol having an alkoxylated aromatic functionality is an alkoxylated phenol.

36. The spandex of claim 35, wherein the alkoxylated phenol is an alkoxylated diphenol or an alkoxylated dihydric phenol.

37. The spandex of claim 1, comprising polymerizing the product of step (b) with at least one diamine and at least one chain extender selected from the group consisting of a diol and an amino alcohol.

38. The spandex of claim 1, further comprising at least one compound selected from the group consisting of a chlorine resistant additive, an antibacterial agent, an antioxidant, a thermal stabilizer, a gas resistant stabilizer, a pigment, a delustrant, an anti-tackiness additive, a heat setting additive, a dye, an emulsifier, a wetting agent, an antistatic agent, a pH regulator, a filament compacting agent, a corrosion inhibitor, a dispersing agent, and a lubricating agent.

39. The method of claim 9, wherein the polymeric glycol is a polycarbonate glycol, a polyester glycol, a polyether glycol, or a mixture of two or more thereof.

40. The method of claim 9, wherein the polyol having an alkoxylated aromatic functionality is an alkoxylated phenol.

41. The method of claim 40, wherein the alkoxylated phenol is an alkoxylated diphenol or an alkoxylated dihydric phenol.

42. The method of claim 9, comprising dry spinning the polyurethane to form the spandex.

43. A spandex spun from a solution of polyurethaneurea in a solvent, wherein the polyurethaneurea is made by a process comprising:
    mixing 95% to 60% by weight polymeric glycol and 5% to 40% by weight alkoxylated bisphenol A to form a resin;
    reacting the resin with at least one organic diisocyanate to form a capped glycol; and
    polymerizing the capped glycol with at least one chain extender to form the polyurethane.

44. The spandex of claim 43, wherein the polymeric glycol is a polycarbonate glycol, a polyester glycol, a polyether glycol, or a mixture of two or more thereof.

45. The spandex of claim 43, wherein the polymeric glycol is polymethyltetrahydrofuran, polybutylene glycol, polytetrahydrofuran, poly(tetramethylene ether)glycol, polypropylene glycol, poly(3-methyl-1,5-pentamethylene ether)glycol, poly(tetramethylene ether-co-3-methyltetramethylene ether)glycol, or a mixture of two or more thereof.

46. The spandex of claim 43, wherein the organic diisocyanate is 4,4'-methylene-bis(phenylisocyanate), 1,1-methylenebis(4-isocyanatocyclohexane), 4-methyl-1,3-phenylene diisocyanate, 5-isocyanato-1-(isocyanatomethyl)-1,3,3-trimethylcyclohexane, 1,6-hexamethylene diisocyanate, toluene-2,4-diisocyanate, or a mixture of two or more thereof.

47. The spandex of claim 43, wherein the at least one chain extender is ethylene diamine, 1,3-cyclohexane diamine, 1,4-cyclohexane diamine, 1,3-diaminopropane, 1,2-diaminopropane, 1,3-diaminopentane, 2-methyl-1,5-pentanediamine, isophorone diamine, 1-amino-3-aminoethyl-3,5,5-trimethyl cyclohexane, or a mixture of two or more thereof.

48. The spandex of claim 43, wherein the polyurethaneurea is made by a process comprising mixing 90% to 70% by weight polymeric glycol and 10% to 30% by weight alkoxylated bisphenol A to form the resin.

49. The spandex of claim 48, wherein the polyurethaneurea is made by a process comprising mixing 90% to 75% by weight polymeric glycol and 10% to 25% by weight alkoxylated bisphenol A to form the resin.

50. The spandex of claim 49, wherein the polyurethaneurea is made by a process comprising mixing 85% to 80% by weight polymeric glycol and 15% to 20% by weight alkoxylated bisphenol A to form the resin.

51. The spandex of claim 43, wherein the capping ratio is 1.5 to 3.

52. The spandex of claim 51, wherein the capping ratio is 1.5 to 2.

53. The spandex of claim 52, wherein the capping ratio is 1.6 to 1.9.

54. The spandex of claim 43, wherein the spandex is dry-spun from the solution of polyurethaneurea in the solvent.

55. A spandex dry-spun from a solution of polyurethaneurea in an organic solvent, wherein the polyurethaneurea is made by a method comprising: mixing 95% to 60% by weight polytetrahydrofuran and 5% to 40% by weight alkoxylated bisphenol A to form a resin; and reacting the resin with 4,4'-methylene-bis(phenylisocyanate), wherein the capping ratio is 1.5 to 3.

56. A spandex dry-spun from a solution of polyurethaneurea in an organic solvent, wherein the polyurethaneurea is made by a process comprising: mixing 95% to 60% by weight polytetrahydrofuran and 5% to 40% by weight alkoxylated bisphenol A to form a resin; reacting the resin with 4,4'-methylene-bis(phenylisocyanate), wherein the capping ratio is 1.5 to 3, to form a capped glycol; and polymerizing the capped glycol with a mixture comprising 83% to 92% by weight ethylenediamine, 8% to 17% 1,2-diaminopropane; and 5% to 15% diethylamine to form the polyurethaneurea.

57. A spandex comprising a polyurethaneurea which comprises an ethoxylated bisphenol A.

* * * * *